No. 779,672. Patented January 10, 1905.

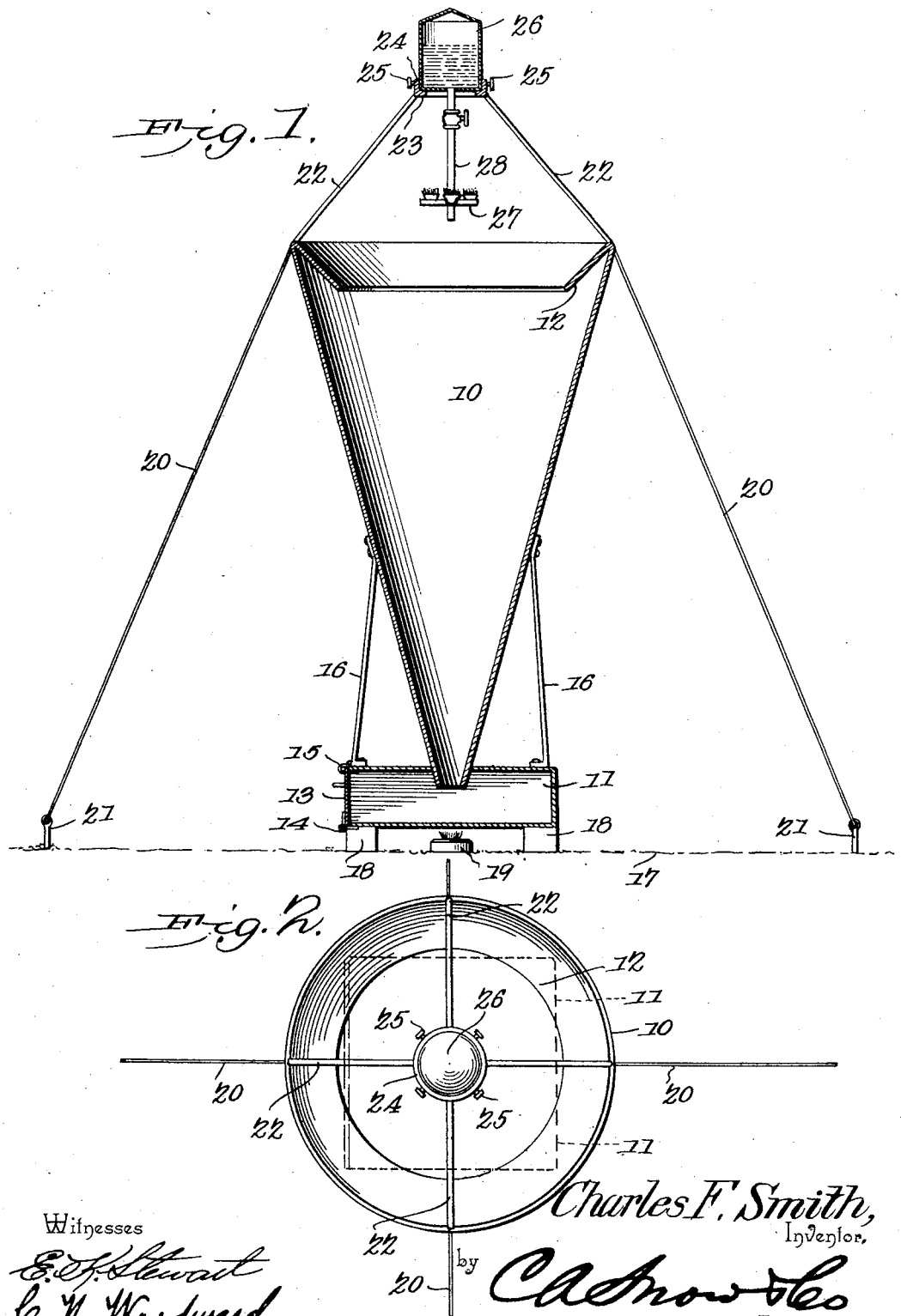

UNITED STATES PATENT OFFICE.

CHARLES F. SMITH, OF DALLAS, TEXAS.

INSECT-TRAP.

SPECIFICATION forming part of Letters Patent No. 779,672, dated January 10, 1905.

Application filed January 11, 1904. Serial No. 188,640.

*To all whom it may concern:*

Be it known that I, CHARLES F. SMITH, a citizen of the United States, residing at Dallas, in the county of Dallas and State of Texas, have invented a new and useful Insect-Trap, of which the following is a specification.

This invention relates to insect-traps more particularly designed for destroying insects which are injurious to growing crops, such as boll-weevils and other night-flying insects, and has for its object to provide an inexpensive and efficient device of this character adapted to display an illuminating device to attract the insects and precipitate them into a receiver, preferably heated, to quickly and certainly destroy them.

Another object of the invention is to produce a device wherein an open-burning illuminating device is employed to attract the insects by its light and destroy them by its heat and flame.

With this and other objects in view, the nature of which will be better understood as the nature of the invention is better understood, the invention consists in certain novel features of construction, as hereinafter shown and described, and specified in the claims.

In the drawings forming a part of this specification, and in which corresponding parts are denoted by like designating characters, is illustrated the preferred form of the embodiment of the invention capable of carrying the same into practical operation, it being understood that the invention is not necessarily limited thereto, as various changes in the form, proportions, and minor modifications in the construction may be resorted to without departing from the principle of the invention or sacrificing any of its advantages, and the right is therefore reserved of making such changes and modifications as may fairly fall within the scope of the invention and of the claims made therefor.

In the drawings thus employed, Figure 1 is a sectional elevation, and Fig. 2 is a plan view, of the improved device.

The present device includes an inverted and open-ended conical body 10, which constitutes a chute, as will hereinafter appear, with its lower end piercing the top of a receiver 11. The upper open end of the body or chute 10 is provided with an inwardly and downwardly converging flange 12, and the receiver 11 is provided with one side 13, having hinges 14 and a catch 15, so that it may be opened for the removal of the destroyed insects. The receiver 11 and body or chute 10 are preferably connected by brace-rods 16, and the receiver will be supported above the ground 17 by blocks 18 or other suitable means to provide for the insertion of a heating means, such as a torch 19, to enable the receiver to be heated to a sufficient extent to accelerate the destruction of the insects that fall therein. The body or chute member is further supported by radiating guys 20, preferably of wire, connected to the ground, as by stakes 21.

Supported above the body or chute member 10 by converging brace members 22 is a frame 23, having an upwardly-extending rim 24, provided with set-screws 25 and providing means for supporting a tank or reservoir 26 for the supply of illuminant for the illuminating device. The illuminant will preferably be some form of hydrocarbon, such as gasolene, and the illuminating device will preferably be an ordinary open-burning gasolene-torch 27 or similar device, which will not be affected by wind or rain and will receive its supply by means of a feed-pipe 28 in the ordinary manner.

The parts will all preferably be of metal, the conductor member and receiver of sheet metal of suitable gage, and the other parts of suitably-shaped metal to withstand the strains to which they will be subjected. The parts may be of any desired size and of any desired capacity and will admirably fulfil all requirements of a successful and efficient trap for all classes of insects which are attracted by lights or illuminating devices.

The herein-described device possesses all the advantages of a light-diffusing attracting apparatus and in addition possesses the advantage of an open-burning illuminating medium, which materially assists in destroying the insects by the heat and flame radiated therefrom and burning above the open end of the body or chute member effectually prevent the escape of the insects if still able to fly after entering the body or chute member. The open-burning illuminating device is therefore an important feature of the invention and adds materially to the value and efficiency of the device. The converging flange within the upper open end of the conductor member is also an important feature of the invention, as it effectually prevents the insects from crawling out of the conductor after they have once fallen therein.

Having thus described the invention, what is claimed is—

1. An insect-trap including a chute-body which is open at its top and bottom, a receiver in communication with the open bottom of the chute-body, and an illuminating device disposed wholly above and in alinement with the open top of the body, said open top being unobstructed and exposed to the external air.

2. An insect-trap comprising an open-ended upright chute-body having its sides converged downwardly, a receiver in communication with the bottom of the chute-body, and an illuminating device disposed wholly above the body and in alinement with the open top thereof, said open top being unobstructed and exposed to the external air.

3. An insect-trap comprising an upright open-ended chute-body provided at its upper end with an inner downwardly-converging annular flange, a receiver in communication with the lower end of the chute-body, and an illuminating device disposed wholly above the open top of the body and alined therewith.

4. An insect-trap comprising an upright open-ended chute-body, a receiver in communication with the lower end of the body, means for imparting heat to the receiver, and an illuminating device disposed wholly above and alined with the open top of the body, said open top being unobstructed and exposed to the external air.

5. An insect-trap comprising a receiver, an upright chute-body open at its opposite ends with its lower end piercing the top of the receiver, brace-rods extending between the receiver and the chute-body, and an illuminating device disposed wholly above and alined with the open top of the body.

6. An insect-trap comprising an upright open-ended chute-body, a receiver in communication with the lower end of the body, a fuel-tank supported above the body, and an illuminating device supported by the tank and disposed wholly above and in alinement with the open top of the body, said open top being unobstructed and exposed to the external air.

7. An insect-trap comprising a receiver, an upright open-ended chute-body having its lower end piercing the receiver, braces extending between the receiver and the body, other braces extending between the body and the ground, and an illuminating device disposed wholly above and alined with the top of the body.

8. An insect-trap comprising a receiver, an upright open-ended chute-body in communication with the receiver, an illuminating device disposed wholly above and in alinement with the open top of the body, and a support rising from the top of the body and connected to the illuminating device, the open top of the chute-body being unobstructed and exposed to the external air.

9. An insect-trap comprising a receiver having supporting-feet, a heating device to be placed beneath the receiver, an open-ended chute-body in communication with the receiver, and an illuminating device at the open top of the chute-body, the open top of the chute-body being unobstructed and exposed to the external air.

10. An insect-trap comprising a receiver having means to impart heat thereto, an upright open-ended chute-body having its sides converging downwardly and piercing the top of the receiver, braces extending between the receiver and the chute-body, an inwardly and downwardly converging annular flange at the top of the body, braces extending from the body to the ground, braces rising from the top of the body, a fuel-tank supported by said braces, and an illuminating device carried by the tank and disposed wholly above and in alinement with the open top of the chute-body.

In testimony that I claim the foregoing as my own I have hereto affixed my signature in the presence of two witnesses.

CHAS. F. SMITH.

Witnesses:
J. B. NORRIS,
H. F. TORRY MITO.